Jan. 15, 1935.  G. M. WOLFE  1,988,029
JOINT COVER
Filed Sept. 11, 1933
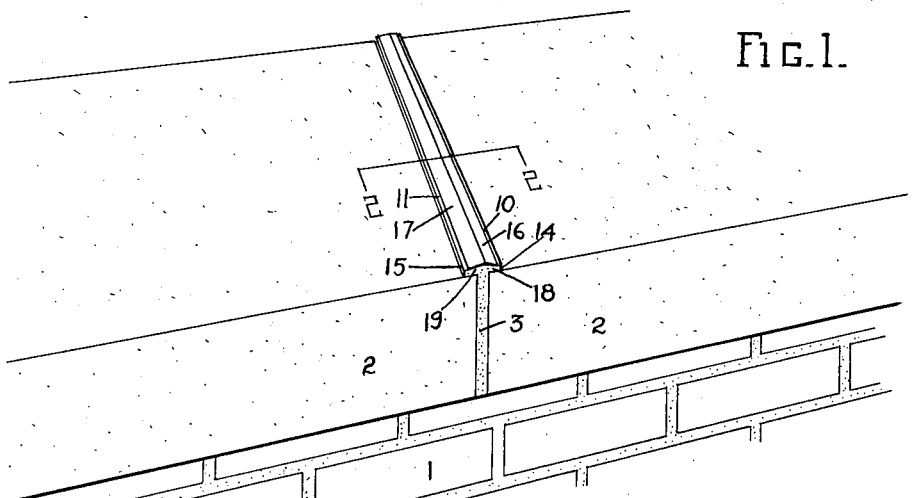
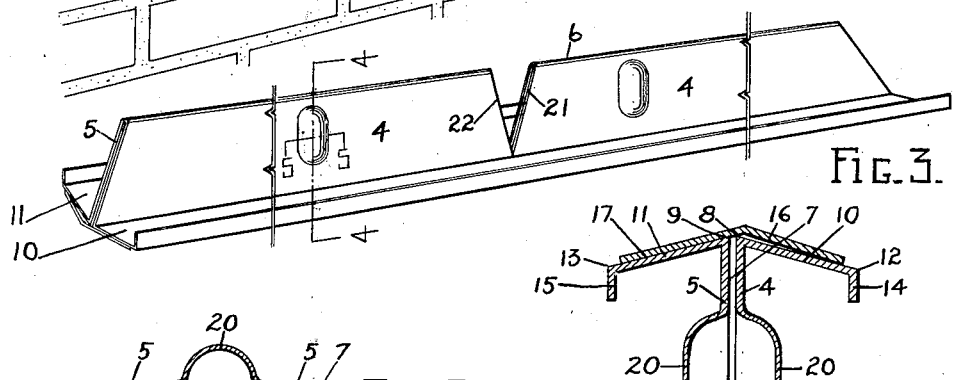
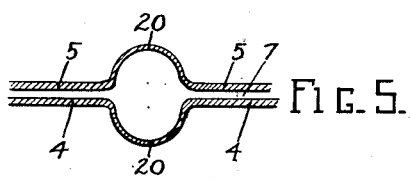
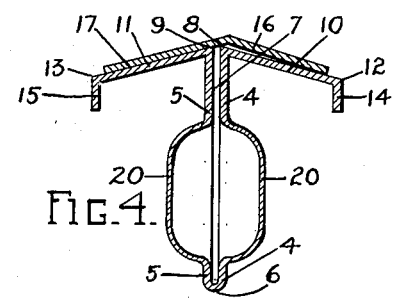
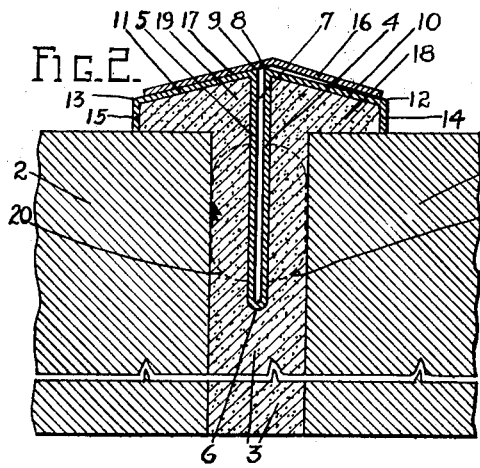
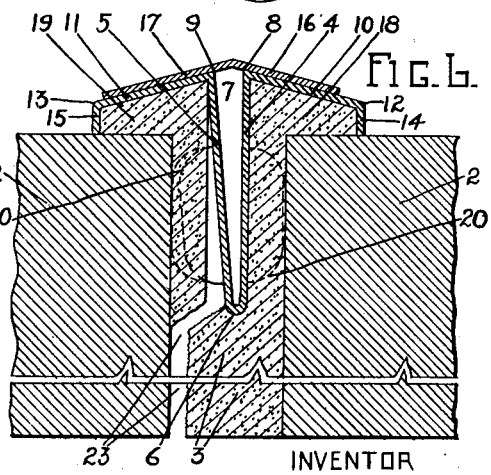
INVENTOR
G. Morton Wolfe Patented Jan. 15, 1935

1,988,029

UNITED STATES PATENT OFFICE 1,988,029

JOINT COVER

George Morton Wolfe, Buffalo, N. Y.

Application September 11, 1933, Serial No. 688,995

6 Claims. (Cl. 72—86)

My invention relates to a protection for the top exposed joints between stone, concrete or terra cotta blocks laid in courses where same are used in building and wall construction chiefly as top coverings of a parapet and fire walls also cornices and belt courses extending outwardly beyond the faces of the building walls and sills for window openings. The spaces between the blocks, when used in courses, vary in width according to design and are usually filled with mason mortar, plastic or elastic material or a combination of these materials.

Shrinkage or contraction of the blocks because of drying out or temperature changes cause cracks to develop at the joints between the blocks and the joint fillers due to the fact that such fillers as mason mortar and plastic or elastic fillers solidify and do not expand when the adjoining blocks contract. Rain and snow water enter the cracks and cause damage to the joints, blocks and also the walls under the blocks and successive freezing and thawing of the moisture in the joints or walls invariably cause damage to the joint and wall material.

All old devices for protecting the joints to prevent the passage of water into the joints are either ineffective, not permanent, not practical or not used because of the high cost of the joint covers or the high cost of installing them.

I claim my joint cover to be an improvement on old joint cover devices because it performs all the functions of old devices yet is simpler in construction, less costly to manufacture, less costly to install, is more easily and cheaply fitted to uneven or angular surfaces, is set without the requirement of any material except the ordinary mason mortar used for setting the blocks and filling the joints, is set without the requirement of any tool or implement except the ordinary trowel used by a mason in setting the blocks and filling the joints, is set without provision of any holes, cuts or chases in the blocks which are costly and tend to weaken the blocks and when installed in a joint my joint cover is self-anchoring in a joint, is self-centering in a joint, requires no separate bolts, screws or other anchoring devices into or between the blocks, cannot become loose upon shrinkage of blocks, is firmly and permanently anchored yet in no way retards the movement of the blocks on either side of the joint, is not dependent on any packing or caulking material to remain soft, pliable or elastic for effectively sealing the joint, cannot become ineffective by contraction of the blocks on either side of a joint, is of such construction and so set that water cannot get under it and upon freezing raise any part of it out of or away from the joint or damage the joint cover material, is not damaged by stepping on top of it and is less conspicuous when in place in a joint.

What I claim in my joint cover to be new is the new and novel method of centering a joint cover in a joint, of anchoring a joint cover in a joint, of holding a joint cover without anchorage of same to the blocks so that upon the widening of the joint the joint cover does not become loose, of covering the open space between the spreading members of a joint cover so as to shed water and keep this space water tight at all times in a new and simpler manner and of the forming of a dam of mortar, same kind as used for the joint, which is fully protected by a joint cover on either side of the joint on and above the level of the blocks.

These novel and new features of my joint cover and improvements on old covers are fully described in this specification and shown on the accompanying drawing in which:—

Fig. 1 is a perspective view of my joint cover installed in the top exposed joint between two coping blocks; Fig. 2 is an enlarged section on the line 2—2, Fig. 1, showing its relation with the adjoining blocks and the joint filling material as first set in the joint and before any movement of the blocks has taken place thru shrinkage or contraction; Fig. 3 is an enlarged perspective view of a piece of my joint cover in an inverted position showing the anchoring and spacing contrivances, the shaping of the ends that these ends will not be in view after a joint cover is set in the joint and also how the cover is cut that it may be bent to fit a pre-determined taper of the top face of a coping block; Fig. 4 is an enlarged section thru my joint cover on the line 4—4, Fig. 3, and shows a section of the anchoring and spacing contrivances; Fig. 5 is an enlarged section thru my joint cover on the line 5—5, Fig. 3, and shows a section of the anchoring and spacing contrivances; Fig. 6 is an enlarged section thru my joint cover on the line 2—2, Fig. 1, showing its relation with the adjoining blocks and joint filling material after shrinkage or contraction of the blocks has increased the joint width.

In the accompanying drawing, Fig. 1, indicates a wall having blocks 2 of stone, concrete or terra cotta laid in a continuous course on the wall with a mortar filled joint 3 between the blocks. Disposed at top of joint between the blocks and parallel with the joint ends of same is a body member 4—5, Fig. 2, preferably of non-ferrous sheet metal, composed of parallel flat, straight and joint length sides 4 and 5 joined at end 6, the downwardly connected end 6 and the upwardly extending ends 8 and 9 being located respectively below and above the top level of the blocks when set in a joint. 7 is the open space between the body members 4 and 5. Extending away from, in opposite directions, downwardly from upper ends 8 and 9 of body members 4 and 5 but a continuation of the body members are flat, straight and joint length top members 10 and 11. These top members terminate at their respective ends 12 and 13 at which ends flat, straight and joint length flanges 14 and 15, continuations of the top members 12 and 13 respectively, extend downwardly preferably parallel to body members 4 and 5, to meet and rest on top of adjoining blocks when joint cover is installed in a joint. These flanges are new and an important feature of my invention as they cause the body members 4 and 5 to spread apart at the top when the space between the blocks increases and this action and the reason for same will be described in detail in this specification.

To center and provide anchorage for my joint cover in a joint between blocks, projections 20, Fig. 4 and Fig. 5 formed from the metal of body members 4 and 5, such projections being less in height than the distance from the body end 6 to the top of the blocks when my joint cover is installed in a joint, are provided, the sizes and spacings of these projections being dependent on the width and length of the joint. This method of centering and anchoring is new and an important feature of my invention for when my joint cover, of proper dimensions is placed in a joint, these projections locate the body member at or near the center, prevent it from locating itself against one of the blocks and thereby destroying part of the effectiveness of the joint cover and are also the means of anchoring the joint cover, all as clearly indicated by the drawing Fig. 2 and Fig. 6.

To prevent moisture from entering open space 7, Fig. 2, between body members 4 and 5 when disposed in a joint, a flat, straight and joint length spring metal cover plate 17 is attached by solder or other suitable fastening method, in a parallel position on and to top member 11, such cover plate extending over open space 7 and over part of top plate 10, the opposite top plate to which the cover plate 17 is attached and from this end which is above and free from top plate 10, a flat, straight and joint length cover plate 16 extends as a continuation of cover plate 17, in a downwardly direction to meet and rest tightly at its free end on top plate 10. The method of preventing water from entering the space between the sides of the spreadable body member is new and an important feature of my invention for it covers space 7 in a very simple and novel manner.

In order that my joint cover can effectively cover joints between blocks having angular or tapered top surfaces, a wedge-shaped piece is cut from the body members 4 and 5 at point where the cover is to be bent to the same angle as the blocks from the end 6 to the under side of top members 10 and 11, such as on lines 21 and 22, Fig. 3, and the top members and cover plates are then bent so the cut edges 21 and 22 of the body members are brought together.

So body members 4 and 5, Fig. 3, will be hidden from view in a joint, these members are cut at an angle from end 6 to the under side of the top members 10 and 11, the angle being such that when the body members are in a joint, end 6 will be back from the face of the joint.

The space formed by upper part of body member 4, top member 10, flange 14, top of block 2 and top of mortar joint 3, Fig. 2, is filled with mortar 18, the same kind of mortar used for mortar filled joint 3. The corresponding opposite space is likewise filled with mortar 19. The method of filling these spaces and the reason therefore is to be described in this specification and this filling, being a part of the mortar filled joint 3, is new and an important feature of my invention.

The lengths, widths, spacings, lappings and angles of or between the body, top, flange members and cover plate and also the thickness and kind of metal to be used for my joint cover is dependent on the size, location and length of the joint to be covered.

The method of setting and anchoring my joint cover is now to be explained. After the space between two adjoining blocks 2 laid in a course on a wall 1 is filled with a cementing material such as mason mortar which becomes hard upon setting, thereby becoming a hard mortar filled joint 3, a joint length piece of my joint cover is placed in the joint before the mortar in the joint becomes hardened. 18 and 19, Fig. 2, is the same kind of mortar used for mortar filled joint 3 and either is placed on my joint cover in the channels formed by flange 14, top member 10 and body member 4 and flange 15, top member 11 and body member 5, when my joint cover is in an inverted position or piled over the joint to completely fill the above mentioned channels when the joint cover is placed over the joint. The joint cover then is placed in position as indicated in Fig. 2, body members 4 and 5 being pressed downwardly with ordinary hand pressure into the mortar filled joint 3, paralleling the sides of the joint, until flanges 14 and 15 rest on top of blocks 2. The mortar of the mortar filled joint 3 and mortars 18 and 19, between the top level of blocks 2 and under side of top members 10 and 11 become a continuous mass upon hardening. My joint cover is now centered in a joint for the projections 20 provide the centering medium and upon the hardening of the mortar around and over the projections and with the mortar of the joint bonded to the blocks, it is firmly anchored in place. A mortar filled joint covered with my joint cover placed as described above is fully protected above the top level of the blocks from water for the mortar bonds to the blocks forming a perfect seal against the passage of water between the mortar and the blocks and the entire top of the joint is completely roofed over with metal thru which no water can penetrate.

I now explain the action of my joint cover in a joint after the joint becomes wider as indicated by Fig. 6. The bond of mason mortar used for setting building blocks such as described in this specification is much greater between this mortar and the blocks than between the mortar and the metal of which the joint cover is made. When either one or both of the blocks 2 shrink or contract the space between them increases. Mortar will not expand in temperatures that cause the blocks to contract. The result, therefore, is a crack somewhere in the joint space between the blocks. If the mortar is of lower tensile strength than the strength of the bond between the mortar and the blocks, a crack will open in the mortar of the joints. If the tensile strength of the mortar is greater than the strength of the bond between the mortar and the blocks, then a crack will open between the mortar of the joints and the block which has the weaker bond with the mortar of the joint. The bond between the mortar of a joint and the material of my joint cover is nearly zero. The mortar filling 18 and 19, being of the same kind as used for mortar filled joint 3, bonds to blocks 2. Flanges 14 and 15 are held in a position away from each other by mortar filling 18 and 19 which mortar is bonded to blocks 2. When the distance between flanges 14 and 15 is increased by reason of shrinkage or contraction of one or both of blocks 2, the flanges 14 and 15 being a continuous part of top members 10 and 11 respectively and these members being continuous parts of body members 4 and 5 respectively, will draw one of the body members, either 4 or 5 away from the other for the force required to spread the body members at the top is less than the force required to shear mortar 18 or 19 from blocks 2. As the sides 4 and 5 are joined at end 6 the pulling action as just described will cause the spreading apart of the sides 4 and 5 at their upper ends 8 and 9 and during this action the cover plate 17, moving with top plate 11 to which it is freely attached, pulls the cover plate 16 with it as this plate is a continuation of 17 The line of contact of cover plate 16 with top plate 10 moves in the direction of the body member 4—5, maintaining a continuous contact as the contact end of the cover plate 16 must slide in an upwardly direction. It is, therefore, obvious that if the blocks expand again to their original sizes after taking a contracted form, the members of my joint cover again assume the same relative positions they held before the movement of the blocks took place including the cover plate which is made of spring metal and shaped to proper angle when in normal position. Now as the blocks pull away from each other, the crack between them either in the mortar joint material or between the block or blocks and the mortar joint material will be of the same width thruout the entire joint for the block or blocks shrink or contract uniformly. This crack, following the course of least resistance will, therefore, extend from the bottom to the top of the joint but as the least resistance is along the body members of my joint cover, the crack occurs along one of these members 4 or 5 and would continue of the same width of crack to the top of the body member if the body member did not spread. However, as these members will spread as explained above, the crack diminishes from full width at bottom of the joint to zero width at the top of a body member, the body members spreading apart at their tops. No matter in which part of the joint the crack is located, it will continue upwardly to the level of the bottom end 6 of the body members 4 and 5 and thence to one of these members as the resistance to shear is less at a body member than at the joint between the mortar joint material and block. As the body members spread apart at the top, the projections used as spacers and anchors pull away from the mortar on the side of the body member that spreads, as shown in Fig. 6 but are again reseated in the holes left in the mortar upon expanding of the blocks. During the pulling of the body member that spreads away from the opposite body member, the projections on this opposite body member remain firmly imbedded in the joint filler material thus maintaining a rigid anchor for my joint cover. Fig. 6 indicates an exact performance of my joint cover when a crack opens between the blocks, this drawing indicating the tensile strength of the mortar in the joint being greater than the bond of the mortar to the block, Body member 4, top member 10 and flange 14 remain in undisturbed position. Mortar 19, adhering to block 2, causes flange 15 to pull, thru the top member 11, body member 5 away from body member 4 and cover plate 16 is pulled by top member 17 causing the free end of cover plate 16 to slide upwardly in tight contact with top member 10. The mortar joint, therefore is, even when cracked, completely covered and sealed the entire length and width of the joint above the level of the top of the block and water cannot enter the crack from the top and get into the interior of the wall.

Having described the invention, what is claimed is:

1. As an improved article of manufacture, a sheet metal device for protecting top exposed masonry joints consisting of a spreadable body member with contrivances thereon designed to center and anchor it in a mason joint, said body member having lateral, downwardly pitched extensions from its free ends and a spring metal cover plate over and attached to one lateral extension continuing over the gap between the free ends of the body member and bent downwardly to slidably contact opposite lateral extension.

2. As an improved article of manufacture, a sheet metal device for protecting top exposed masonry joints consisting of a spreadable body member with contrivances thereon designed to center and anchor it in a mason joint, said body member having lateral, downwardly pitched and flanged extensions from its free ends and a spring metal cover plate over and attached to one lateral extension continuing over the gap between the free ends of the body member and bent downwardly to slidably contact opposite lateral extension.

3. In combination with coursed building blocks spaced apart over or extending from a wall, joint spaces between the blocks, a spreadable metal body disposed in a joint with closed end located below the top level of the blocks and body extending above the top level of the blocks, spacing and anchoring devices on the body to locate it lengthwise in the center of a joint and to rigidly anchor it in place when joint space is filled with cementing material, lateral extensions from the free ends of the body to cover joint space above the level of the top of the blocks pitched downwardly over and above the edges of the blocks, cementing material to fill the joint space and surround the body in a joint space to hold body in a joint and cementing material to fill the space between the lateral extensions and top of the blocks to seal the joint above the top level of the blocks.

4. In combination with coursed building blocks spaced apart over or extending from a wall, joint spaces between the blocks, a spreadable metal body disposed in a joint with closed end located below the top level of the blocks and body extending above the top level of the blocks, spacing and anchoring devices on the body to locate it lengthwise in the center of a joint and to rigidly anchor it in place when joint space is filled with cementing material, lateral extensions from the free ends of the body to cover joint space above the level of the top of the blocks pitched downwardly over and above the edges of the blocks, flanges from free ends of the lateral extensions turned downwardly to rest on the blocks, cementing material to fill the joint space and surround the body in a joint space to hold body in a joint and cementing material to fill the spaces between the flanged lateral extensions and top of the blocks to seal the joint above the top level of the blocks and to cause body to spread at the top as joint space increases in width.

5. In combination with coursed building blocks spaces apart over or extending from a wall, joint spaces between the blocks, a spreadable metal body disposed in a joint with closed end located below the top level of the blocks, spacing and anchoring devices on the body to locate it lengthwise in the center of a joint and to rigidly anchor it in place when joint space is filled with cementing material, lateral extensions from the free ends of the body to cover joint space above the level of the top of the blocks pitched downwardly over and above the edges of the blocks, cementing material to fill the joint space and surround the body in a joint space to hold body in a joint, cementing material to fill the space between the lateral extensions and top of the blocks to seal the joint above the top level of the blocks and a cover plate of spring metal over and rigidly attached to one lateral extension, continuing over the gap between sides of the body member and bent downwardly to tightly contact the opposite lateral extension, this edge of the cover plate being free to slide on this lateral extension as the gap increases in width.

6. In combination with coursed building blocks spaced apart over or extending from a wall, joint spaces between the blocks, a spreadable metal body disposed in a joint with closed end located below the top level of the blocks and body extending above the top level of the blocks spacing and anchoring devices on the body to locate it lengthwise in the center of a joint and to rigidly anchor it in place when joint space is filled with cementing material, lateral extensions from the free ends of the body to cover joint space above the level of the top of the blocks pitched downwardly over and above the edges of the blocks, flanges from free ends of the lateral extensions turned downwardly to rest on the blocks, cementing material to fill the joint space and surround the body in a joint space to hold body in a joint, cementing material to fill the spaces between the flanged lateral extensions and top of the blocks to seal the joint above the top level of the blocks and to cause body to spread at the top as joint space increases in width and a cover plate of spring metal over and rigidly attached to one lateral extension, continuing over the gap between the sides of the body member and bent downwardly to tightly contact the opposite lateral extension, this edge of the cover plate being free to slide on this lateral extension as the gap increases in width.

G. MORTON WOLFE.